United States Patent
Shima et al.

(10) Patent No.: US 9,704,047 B2
(45) Date of Patent: Jul. 11, 2017

(54) MOVING OBJECT RECOGNITION APPARATUS

(71) Applicant: Hitachi Automotive Systems, Ltd., Hitachinaka-shi, Ibaraki (JP)

(72) Inventors: Takeshi Shima, Tokyo (JP); Haruki Matono, Tokyo (JP); Hiroto Morizane, Tokyo (JP); Tatsuhiko Monji, Hitachinaka (JP)

(73) Assignee: Hitachi Automotive Systems, Ltd., Hitachinaka-shi, Ibaraki ( * ) Notice: Subject to any disclaimer, the term of this patent is extended or adjusted under 35 U.S.C. 154(b) by 135 days.

(21) Appl. No.: 14/422,450

(22) PCT Filed: Jul. 26, 2013

(86) PCT No.: PCT/JP2013/070274
§ 371 (c)(1),
(2) Date: Feb. 19, 2015

(87) PCT Pub. No.: WO2014/050286
PCT Pub. Date: Apr. 3, 2014

(65) Prior Publication Data
US 2015/0235093 A1      Aug. 20, 2015

(30) Foreign Application Priority Data
Sep. 26, 2012   (JP) ................. 2012-211663

(51) Int. Cl.
G06K 9/00   (2006.01)
G06K 9/46   (2006.01)
G06T 7/20   (2017.01)

(52) U.S. Cl.
CPC ..... *G06K 9/00805* (2013.01); *G06K 9/00624* (2013.01); *G06K 9/46* (2013.01); *G06T 7/20* (2013.01); *G06K 2009/4666* (2013.01)

(58) Field of Classification Search
None
See application file for complete search history.

(56) References Cited

U.S. PATENT DOCUMENTS

2004/0012516 A1* 1/2004 Schiffmann ........... G01S 13/878
                                                                342/70
2005/0201590 A1   9/2005 Kudo
(Continued)

FOREIGN PATENT DOCUMENTS

| JP | 6-325180 A | 11/1994 |
| JP | 2005-228127 A | 8/2005 |
| JP | 2006-41939 A | 2/2006 |

OTHER PUBLICATIONS

Khan et al., "Consistent labeling of tracked objects in multiple cameras with overlapping fields of view", IEEE Transactions on Pattern Analysis and Machine Intelligence, vol. 25, No. 10, Oct. 2003.*

(Continued)

*Primary Examiner* — Soo Park
(74) *Attorney, Agent, or Firm* — Crowell & Moring LLP

(57) ABSTRACT

To provide a moving object recognition apparatus that earlier detects a moving object crossing a road, the moving object recognition apparatus includes a left imaging unit 101, a right imaging unit 102, a moving object detection unit that detects a moving object based on images imaged by the left imaging unit and the right imaging unit, wherein, suppose that non-overlap regions in which an imaging region of the left imaging unit 101 and an imaging region of the right imaging unit 102 do not overlap are first regions 203, 204 and an overlap region in which the imaging region of the left imaging unit and the imaging region of the right imaging unit overlap is a second region 205, the moving (Continued)

object detection unit uses different methods of detecting the moving object between the first regions and the second region.

15 Claims, 5 Drawing Sheets

(56) References Cited

U.S. PATENT DOCUMENTS

2005/0285966 A1* 12/2005 Bamji ...................... G01C 3/08
 348/336
2007/0229238 A1* 10/2007 Boyles ............... G06K 9/00369
 340/435
2011/0115615 A1* 5/2011 Luo ........................... B60R 1/00
 340/436

OTHER PUBLICATIONS

International Search Report (PCT/ISA/210) dated Oct. 1, 2013 with English translation thereof {Three (3) pages}.

* cited by examiner

RELATIVE DISTANCE D FROM STEREO CAMERA APPARATUS TO POINT 601

$$D = f * d / (d_2 + d_3) = f * d / \{ (d_4 + d_5) * a \}$$

MOVING OBJECT RECOGNITION APPARATUS

TECHNICAL FIELD

This invention relates to a moving object recognition apparatus that detects a moving object from image information outside of a vehicle.

BACKGROUND ART

Research and development regarding apparatuses that detect hazardous events around vehicles to realize safe traveling of the vehicles and automatically control steering, acceleration, brake of the vehicles to avoid the detected hazardous events are carried out and the apparatuses have been already mounted on some vehicles. Among them, a system that senses a pedestrian crossing ahead using a sensor mounted on the vehicle and issues alerts to a driver and applies automatic brake if there is a possibility of collision with the pedestrian is effective in improvement of safety of the vehicle.

In PTL 1, three-dimensional information to an object is obtained from differences in vision of left and right cameras of a stereo camera, a solid object is detected from the information, whether or not the detected object has a shape and a size of a pedestrian is determined, further, the moving velocity of the detected solid object is obtained, and thereby, whether or not the detected solid object is a crossing pedestrian having the potential to enter the own vehicle traveling route is determined.

CITATION LIST

Patent Literature

PTL 1: JP-A-2005-228127

SUMMARY OF INVENTION

Technical Problems

However, as in PTL 1, when the differences in vision of left and right cameras are obtained using the stereo camera, the corresponding point of images of the left and right cameras is obtained by image processing, and thereby, the calculation result fluctuates among time-series frames and time is taken before convergence of the value of the moving velocity of the detected solid object. Accordingly, time is taken to detect the crossing pedestrian having the potential to enter the own vehicle traveling route.

In view of the above described problem, an object of the invention is to provide a moving object recognition apparatus that earlier detects a moving object crossing a road.

Solution to Problems

In view of the above described problem, a moving object recognition apparatus of the invention includes a first imaging unit, a second imaging unit, and a moving object detection unit that detects a moving object based on images imaged by the first imaging unit and the second imaging unit, wherein, suppose that a non-overlap region in which an imaging region of the first imaging unit and an imaging region of the second imaging unit do not overlap is a first region and an overlap region in which the imaging region of the first imaging unit and the imaging region of the second imaging unit overlap is a second region, the moving object detection unit uses different methods of detecting the moving object between the first region and the second region.

Advantageous Effects of Invention

A moving object recognition apparatus that earlier detects a moving object crossing a road may be provided.

DESCRIPTIONS OF EMBODIMENTS

As below, respective examples will be explained using the drawings.

One embodiment of a moving object recognition apparatus that senses a moving object crossing a road, a pedestrian in the example, using images of a stereo camera mounted on a vehicle will be explained using FIG. 1.

Figure 1:
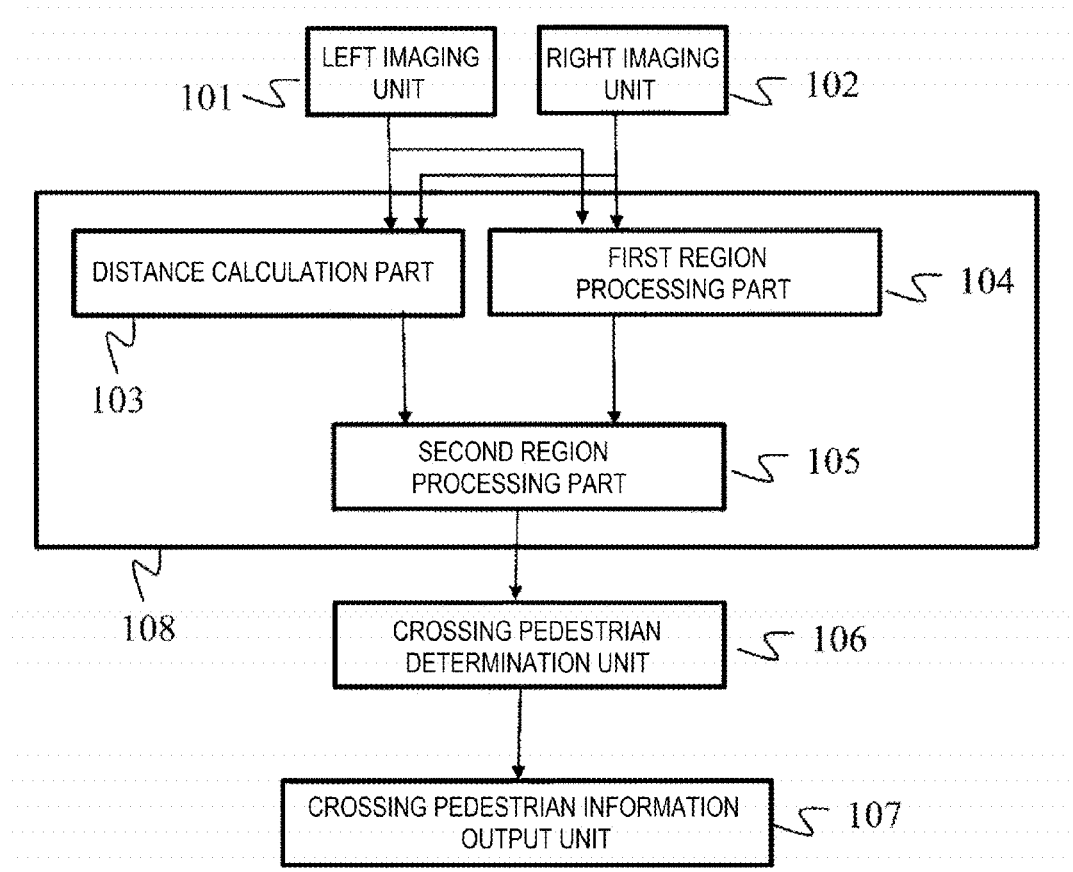
FIG. 1 shows one embodiment of a moving object recognition apparatus according to the invention.

FIG. 1 is a block diagram for realization of a stereo camera as a moving object recognition apparatus of the invention. The stereo camera includes a left imaging unit 101 as a first imaging unit, a right imaging unit 102 as a second imaging unit, and a moving object detection unit 108 that detects a moving object based on images imaged by the left imaging unit 101 and the right imaging unit 102, and detects a moving object by imaging ahead of a vehicle with the stereo camera mounted thereon. The moving object detection unit 108 includes a distance calculation part 103, a first region processing part 104, and a second region processing part 105. A first image imaged by the left imaging unit 101 and a second image imaged by the right imaging unit 102 are input, and the distance calculation part 103 calculates a distance to an object from differences on the first image and the second image of the same object imaged by the left imaging unit 101 and the right imaging unit 102. The details of the distance calculation part 103 will be described later.

Figure 2:
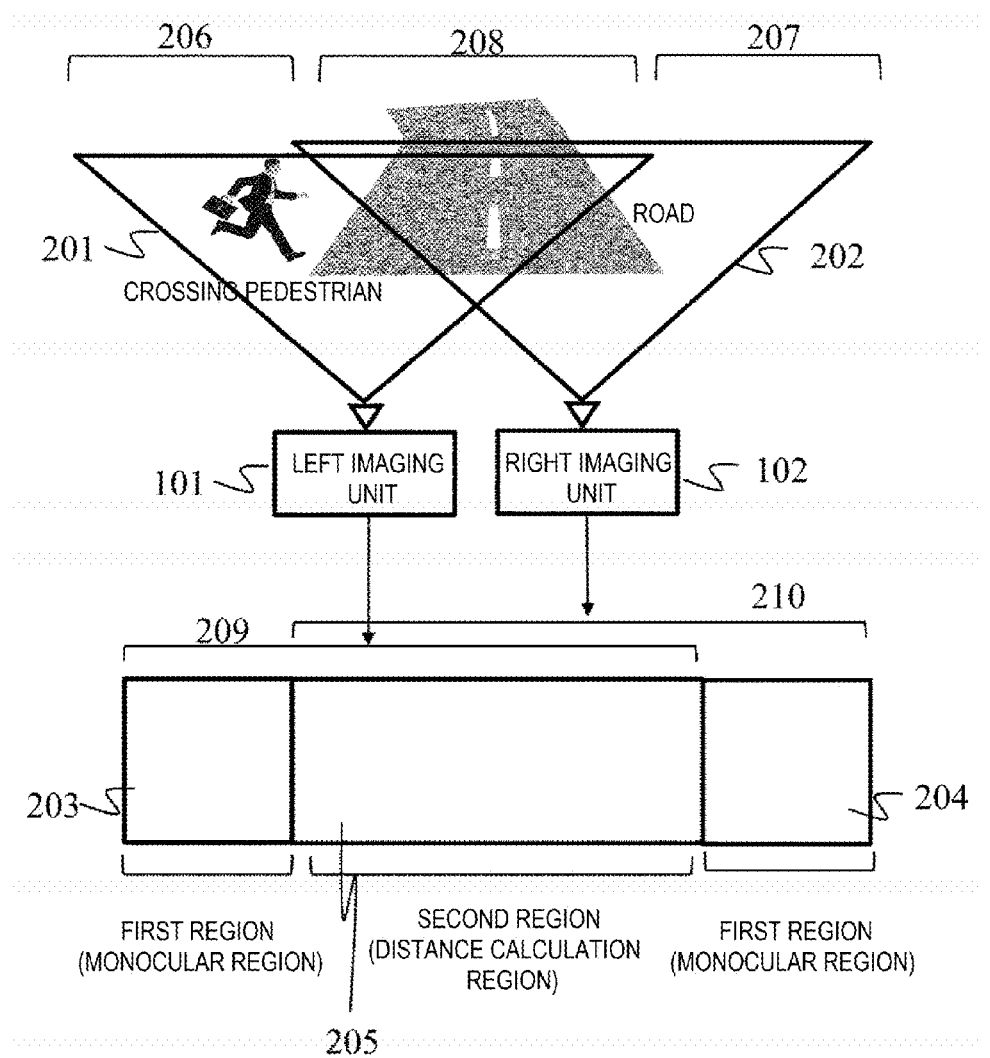
FIG. 2 is a diagram for explanation of the moving object recognition apparatus according to the invention.

The first region processing part 104 senses a crossing pedestrian (a pedestrian crossing a road) from images in non-overlap regions of the left imaging unit 101 and the right imaging unit 102. Here, the non-overlap regions refer to regions in which an imaging range 201 of the left imaging unit 101 and an imaging range 202 of the right imaging unit 102 do not overlap (a non-overlap region 206 of the left imaging unit and a non-overlap region 207 of the right imaging unit) in FIG. 2. The images include an image 209 imaged by the left imaging unit and an image 210 imaged by the right imaging unit, and the region of the non-overlap region of the left imaging unit 101 is a first region 203 and the region of the non-overlap region of the right imaging unit 102 is a first region 204. The details of the first region processing part 104 will be described later.

The second region processing part 105 senses a crossing pedestrian from the image of the overlap region of the left imaging unit 101 and the right imaging unit 102. Here, the overlap region is an overlap region 208 in which the imaging range 201 of the left imaging unit 101 and the imaging range 202 of the right imaging unit 102 overlap. On the images, the overlap region is a second region 205. The details of the second region processing part 105 will be described later.

The features of the invention are in that methods of detecting a moving object are different between the above described first regions 203, 204 and second region 205. The details will be described later. In the first region, the moving object is detected based on one image imaged by a monocular camera of the left imaging unit 101 as the first imaging unit or the right imaging unit 102 as the second imaging unit, and, in the second region, the moving object is detected using the two cameras of the left imaging unit 101 and the right imaging unit 102 as the stereo camera. Thereby, it may be possible to earlier detect a moving object such as a pedestrian crossing a road.

A crossing pedestrian determination unit 106 is a collision determination unit that determines whether a crossing pedestrian sensed by the second region processing part 105 enters an own vehicle traveling route and collides with an own vehicle or a possibility of collision. If a determination that the possibility of collision is higher is made, a crossing pedestrian information output unit 107 outputs information of a position and a velocity of the crossing pedestrian, and the vehicle issues an alert to a driver and performs automatic brake control not to collide with the crossing pedestrian based on the information of the position and the velocity of the crossing pedestrian.

Figure 3:
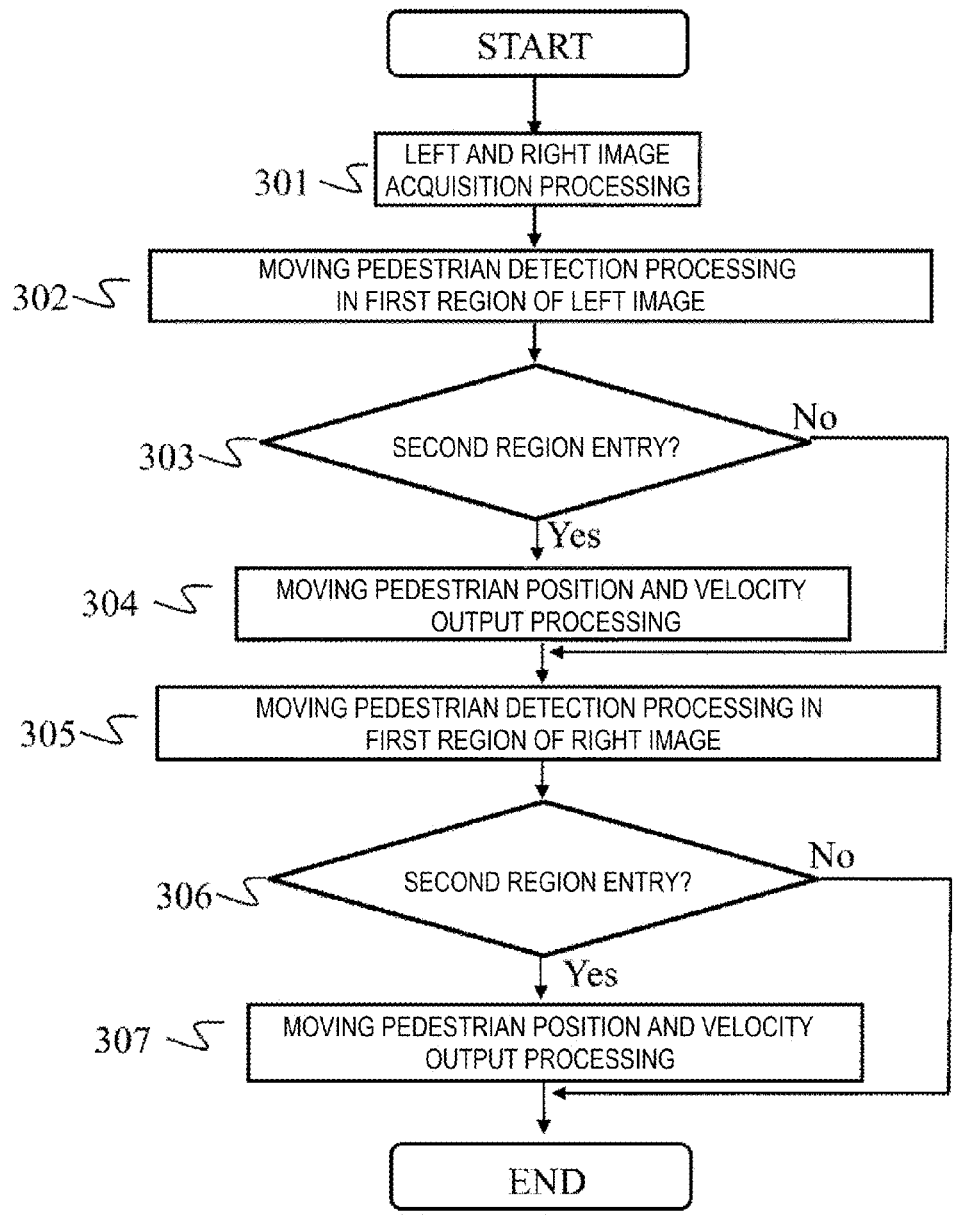
FIG. 3 shows a processing flow of a first region processing part of the invention.

Next, processing performed in the first region processing part 104 will be explained using FIG. 3.

First, in left and right image acquisition processing 301, the images imaged by the left imaging unit 101 as the first imaging unit and the right imaging unit 102 as the second imaging unit (a left image as the first image and a right image as the second image) are acquired.

Then, in moving pedestrian detection processing in the first region of the left image 302, candidates of moving pedestrians are detected using the images of the first region 203 as the non-overlap region of the left and right imaging units of the first images (left images) imaged by the left imaging unit 101. To detect the candidates of the moving pedestrians, first, time-series successive images of the first region 203 are compared and parts in which the images have changed and objects have moved are detected. To detect the parts in which the images have changed and the objects have moved, first, an optical flow of the time-series successive images is calculated. The optical flow may be calculated by comparing images of two frames and identifying pixels respectively corresponding to the same object contained in the respective two images, which is a known technology that has been already established. Then, from the obtained parts in which the images have changed and the objects have moved, parts showing different movements from the movement of the background with the movement of the vehicle are extracted.

To detect the movement of the background with the movement of the vehicle, the movement of the background is estimated using vehicle information including the vehicle velocity and the yaw rate and geometric conditions including internal parameters (the unit cell size of the image sensor, the focal length, the distortion parameter) and external parameters (the installation height of the camera, the depression angle, the rotation angle) of the camera. For example, the estimation of the movement of the background is described in Non Patent Literature "Masahiro Kiyohara, et al., Sharyou Shuuhen Kanshi no tameno Idoutai Kenshutu Gigyutsu no Kaihatsu, Vision Engineering Workshop Papers (2011) pp. 59-63". Finally, the movement of the background is cancelled from the parts in which the images have changed and the objects have moved, and, of the extracted parts showing the different movements from the movement of the background with the movement of the vehicle, the parts having sizes within a certain range are employed as the candidates of the moving pedestrians. Here, the sizes within the certain range refer to sizes obtained by previously calculating sizes in which objects having average sizes from child pedestrians to adult pedestrians are imaged on the screen. Further, of them, only the candidates moving from the first region 203 to the second region 205 are employed as the candidates of the moving pedestrians.

Then, in second region entry determination processing 303, whether or not the candidates of the moving pedestrians detected in the moving pedestrian detection processing in the first region of the left image 302 enter the second region 205 from the first region 203 in the next frame is determined. If the entry into the second region 205 in the next frame is determined using the moving velocities of the moving pedestrians on the images sensed in the moving pedestrian detection processing in the first region of the left image 302, the processing moves to moving pedestrian position and velocity output processing 304. If no entry into the second region 205 in the next frame is determined, the processing moves to moving pedestrian detection processing in the first region of the right image 305.

Then, in the moving pedestrian position and velocity output processing 304, the positions and the velocities on the images of the candidates of the moving pedestrians detected in the moving pedestrian detection processing in the first region of the left image 302 are output. The output results are used as initial values for sensing moving pedestrians in the second region processing part 105.

Then, in the moving pedestrian detection processing in the first region of the right image 305, candidates of moving pedestrians are detected using images of the first region 204 as the non-overlap region of the left and right imaging units of the second images (right images) imaged by the right imaging unit 102. The method of detecting the candidates of the moving pedestrians is the same as that of the moving pedestrian detection processing in the first region of the left image 302. First, time-series successive images of the first region 204 are compared and parts in which the images have changed and objects have moved are detected, and, among them, parts showing different movements from the movement of the background with the movement of the vehicle and having sizes within a certain range are employed as the candidates of the moving pedestrians. Further, of them, only the candidates moving from the first region 204 to the second region 205 are employed as the candidates of the moving pedestrians.

Then, in second region entry determination processing 306, whether or not the candidates of the moving pedestrians detected in the moving pedestrian detection processing in the first region of the right image 305 enter the second region 205 from the first region 204 in the next frame is determined. If the entry into the second region 205 in the next frame is determined using the moving velocities on the images of the moving pedestrians sensed in the moving pedestrian detection processing in the first region of the right image 305, the processing moves to moving pedestrian position and velocity output processing 307. If no entry into the second region 205 in the next frame is determined, the processing is ended.

Then, in the moving pedestrian position and velocity output processing 307, the positions and the velocities on the images of the candidates of the moving pedestrians detected in the moving pedestrian detection processing in the first region of the right image 305 are output. The output results are used as initial values for sensing moving pedestrians in the second region processing part 105.

Figure 4:
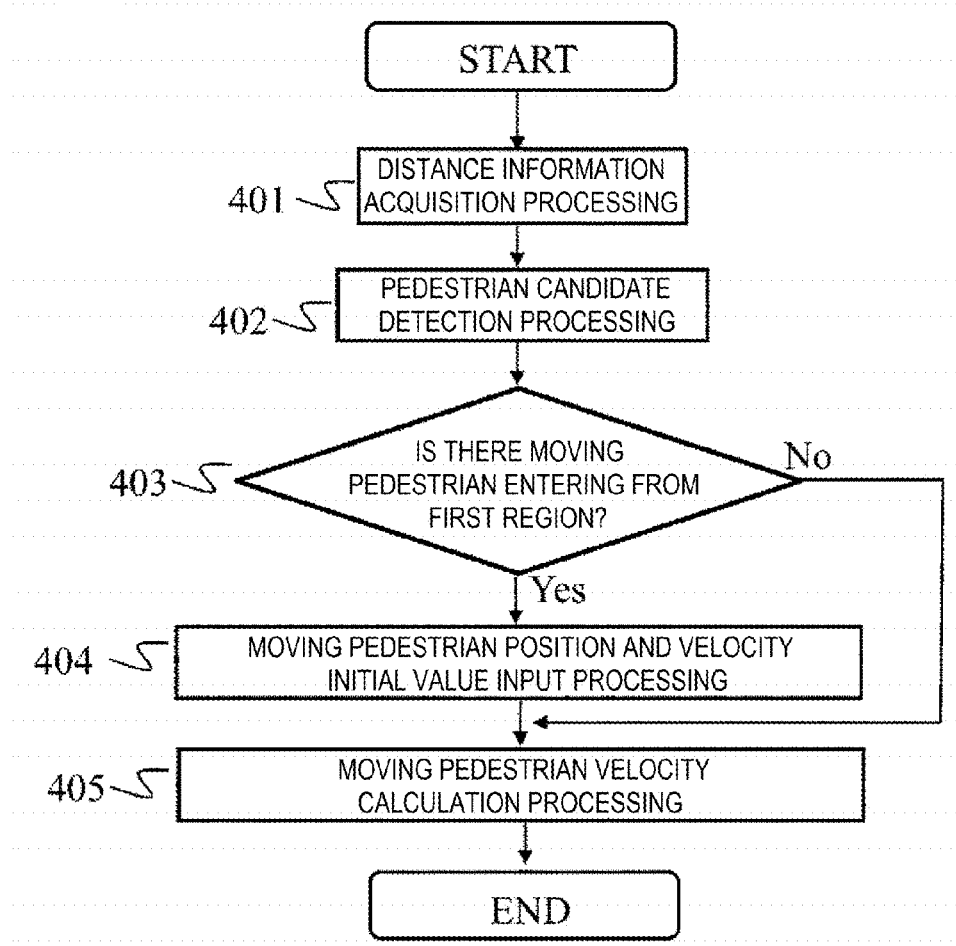
FIG. 4 shows a processing flow of a second region processing part of the invention.

Next, the processing performed in the second region processing part 105 will be explained using FIG. 4.

In distance information acquisition processing 401, three-dimensional distance information to an object ahead of the own vehicle calculated in the distance calculation part 103 is acquired. The method of acquiring the three-dimensional distance information to the object ahead of the own vehicle using the distance calculation part 103 will be described later.

Then, in pedestrian candidate detection processing 402, using the distance information acquired in the distance information acquisition processing 401, first, in a distance image in which the distance information is visualized, distances in positions closest to the own vehicle are extracted as representative values with each section formed by longitudinally dividing the distance image one by one, the distance data existing closer in the representative values are grouped, and groups having certain or larger sizes are employed as solid objects. A travel plane on which the vehicle travels is estimated, and the objects above the travel plane are detected. The processing of extracting the solid object is described in Non Patent Literature "Toru Saito, et al., Sutereo Gazou Ninshiki Unten Shien Shisutemu no Sofutowea Kaihatsu ni tuite, The 14th Symposium of Sensing via Image Information Papers, IN2-14 (2008)".

Then, whether or not the detected solid objects are pedestrians is determined based on the sizes and the shapes of the detected solid objects. Regarding the sizes of the solid objects, average values of the sizes of pedestrians from children to adults are previously learned and, if the objects have the sizes within the range of the learned values, the objects are determined as the pedestrians. Further, regarding the shapes of the solid objects, if the upper portions of the solid objects resemble shapes of a head and shoulders of a human, the objects are determined as the pedestrians. Furthermore, of the solid objects determined as the pedestrians, the solid objects moving from the parts of the second region 205 adjacent to the first regions 203, 204 to the center part of the second region are extracted.

Then, in moving pedestrian entry determination processing 403, if there is a moving pedestrian entering the second region 205 from the first regions 203, 204, the processing moves to moving pedestrian position and velocity initial value input processing 404, and, if there is no moving pedestrian entering the second region 205 from the first regions 203, 204, the processing moves to moving pedestrian velocity calculation processing 405. Here, to determine whether or not there is a moving pedestrian entering from the first regions, if there is result output from the moving pedestrian position and velocity output processing 304 or 307 of the processing flow of the first region processing part 104 in FIG. 3, a determination that there is a moving pedestrian entering from the first regions is made.

Then, in the moving pedestrian position and velocity initial value input processing 404, the positions and the velocities of the moving pedestrians on the images output in the moving pedestrian position and velocity output processing 304, 307 are employed as initial values of the solid objects detected in the pedestrian candidate detection processing 402.

Then, in the moving pedestrian velocity calculation processing 405, the initial values of the positions and velocities obtained in the moving pedestrian position and velocity initial value input processing 404 are provided to the solid objects employed as the candidates in the pedestrian candidate detection processing 402, the moving velocities of the solid objects are obtained, and the results are employed as the velocities of the moving pedestrians. In this regard, in the moving pedestrian entry determination processing 403, if a determination that there is no moving pedestrian entering the second region from the first regions is made and there are no initial values of the positions and the velocities of the moving pedestrians, the initial value of the velocities is set to zero and the velocities of the moving pedestrians are calculated.

Figure 5:
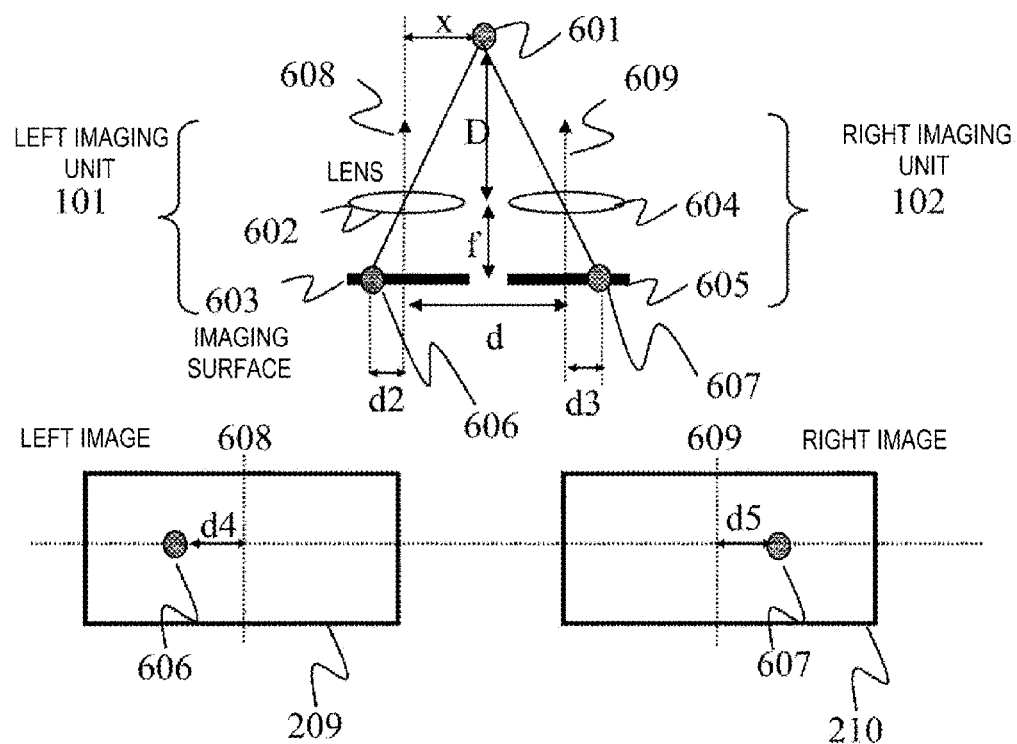
FIG. 5 is a diagram for explanation of parallax calculation processing of a distance calculation part of the invention.

Next, the method of acquiring the three-dimensional distance information to the object ahead of the own vehicle by the distance calculation part 103 of FIG. 1 will be explained using FIG. 5. FIG. 5 is for explanation of the method of calculating distances from cameras of a corresponding point 601 (the same object imaged by the left and right imaging units) of the image 209 imaged by the left imaging unit and the image 210 imaged by the right imaging unit of the stereo camera apparatus as the moving object recognition apparatus.

In FIG. 5, the left imaging unit 101 is a camera having a lens 602 and an imaging surface 603 with a focal length f and an optical axis 608 of an image sensor, and the right imaging unit 102 is a camera having a lens 604 and an imaging surface 605 with a focal length f and an optical axis 609 of an image sensor. The point 601 ahead of the cameras is imaged to a point 606 (at a distance $d_2$ from the optical axis 608) on the imaging surface 603 of the left imaging unit 101 and forms the point 606 (in a position of $d_4$ pixel from the optical axis 608) in the left image 209. Similarly, the point 601 ahead of the cameras is imaged to a point 607 (at a distance $d_3$ from the optical axis 609) on the imaging surface 605 of the right imaging unit 102 and forms the point 607 (in a position of $d_5$ pixel from the optical axis 609) in the right image 210.

As described above, the corresponding point 601 of the same object is imaged to the position of the $d_4$ pixel to the left from the optical axis 608 in the left image 209 and imaged to the position of the $d_5$ pixel to the right from the optical axis 609 in the right image 210, and parallax of $d_4+d_5$ pixel is caused. Accordingly, suppose that the distance between the optical axis 608 of the left imaging unit 101 and the corresponding point 601 is x, $d_2$:f=x:D from the relationship between the corresponding point 601 and the left imaging unit 101 and $d_3$:f=(d−x):D from the relationship between the corresponding point 601 and the right imaging unit 102, and thereby, the distance D from the stereo camera apparatus to the corresponding point 601 may be obtained.

Therefore, D=f×d/($d_2+d_3$)=f×d/((d4+d5)×a).

Here, a is a size of the image sensors of the imaging surfaces 603, 605.

REFERENCE SIGNS LIST

101: left imaging unit, 102: right imaging unit, 103: distance calculation part, 104: first region processing part, 105: second region processing part, 106: crossing pedestrian determination unit, 107: crossing pedestrian information output unit, 108: moving object detection unit, 201: imaging range of the left imaging unit, 202: imaging range of the right imaging unit, 203: first region, 204: first region, 205: second region, 206: non-overlap region of the left imaging unit, 207: non-overlap region of the right imaging unit, 208: overlap region, 209: image imaged in the left imaging unit, 210: image imaged in the right imaging unit, 301: left and right image acquisition processing, 302: moving pedestrian detection processing in the first region of the left image, 303: second region entry determination processing, 304: moving pedestrian position and velocity output processing, 305: moving pedestrian detection processing in the first region of the right image, 306: second region entry determination processing, 307: moving pedestrian position and velocity output processing, 401: distance information acquisition processing, 402: pedestrian candidate detection processing, 403: moving pedestrian entry determination processing, 404: moving pedestrian position and velocity initial value input processing, 405: moving pedestrian velocity calculation processing, 601: corresponding point, 602: lens, 603: imaging surface, 604: lens, 605: imaging surface, 606: point, 607: point, 608: optical axis, 609: optical axis

The invention claimed is:

1. A moving object recognition apparatus comprising:
a first imaging unit;
a second imaging unit; and
a processor configured to determine whether a moving object is present based on images captured by the first imaging unit and the second imaging unit,
wherein, suppose that a non-overlap region in which an imaging region of the first imaging unit and an imaging region of the second imaging unit do not overlap is a first region and an overlap region in which the imaging region of the first imaging unit and the imaging region of the second imaging unit overlap is a second region,
the processor differentiates a method of detecting the moving object between the first region and the second region,
calculates a distance to the moving object based on the images captured by the first imaging unit and the second imaging unit;
senses the moving object from an image of the first region; and
senses the moving object from an image of the second region based on the distance to the moving object and a sensing result of the moving object in the first region;
acquires a first image captured by the first imaging unit and a second image captured by the second imaging unit;
detects moving object candidates using time-series image information in the first region of the first image or the second image;
determines whether or not the detected moving object candidates enter the second region; and
outputs information of positions and velocities of only the moving object candidates that have been determined to enter the second region;
wherein the processor calculates an optical flow of the time-series image information by comparing images of two frames and identifying pixels respectively corresponding to the same object contained in the respective two images, and extracts parts showing different movements from movement of a background with movement of the moving object from obtained parts in which the images have changed and the moving object has moved;
wherein the movement of the background is cancelled from the obtained parts in which the images have changed and the moving object has moved, and the extracted parts having sizes within a range are employed as the pedestrian candidates; and
wherein the sizes within the range were obtained by previously calculating sizes in which objects having average sizes from child pedestrians to adult pedestrians are imaged on the screen, and only the pedestrian candidates moving from the first region to the second region are employed as the pedestrian candidates.

2. The moving object recognition apparatus according to claim 1, wherein a determination is made whether or not the pedestrian candidates detected in the first region of the first image enter the second region from the first region in the next frame.

3. The moving object recognition apparatus according to claim 2, wherein the positions and the velocities on the images of the pedestrian candidates detected in the first region of the first image are output and used as initial values for sensing moving pedestrians.

4. The moving object recognition apparatus according to claim 3, wherein, in the first region of the second image, the pedestrian candidates are detected using images of the first region as the non-overlap region of the first and second imaging units of the second image imaged by the second imaging unit.

5. The moving object recognition apparatus according to claim 4, wherein, for the sizes of the moving object, average values of the sizes of pedestrians from children to adults are previously learned and, if the moving object has the sizes within a range of the learned values, the moving object is determined as a pedestrian.

6. The moving object recognition apparatus according to claim 5, wherein, for shapes of the moving object, if upper portions of the moving object resemble shapes of a head and shoulders of a human, the moving object is determined as the pedestrian.

7. The moving object recognition apparatus according to claim 5,
wherein initial values of the positions and velocities are provided to the moving object employed as the pedestrian candidates, the moving velocities of the moving object are obtained and employed as the velocities of moving pedestrians; and
wherein, if a determination is made that there is no moving pedestrian entering the second region from the first region and there are no initial values of the positions and the velocities of the moving pedestrians, the initial value of the velocities is set to zero and the velocities of the moving pedestrians are calculated.

8. The moving object recognition apparatus according to claim 1, wherein, for the sizes of the moving object, average values of the sizes of pedestrians from children to adults are previously learned and, if the moving object has the sizes within a range of the learned values, the moving object is determined as a pedestrian.

9. A moving object recognition apparatus comprising:
a first imaging unit;
a second imaging unit; and
a processor configured to determine whether a moving object is present based on images captured by the first imaging unit and the second imaging unit,
wherein, suppose that a non-overlap region in which an imaging region of the first imaging unit and an imaging region of the second imaging unit do not overlap is a first region and an overlap region in which the imaging region of the first imaging unit and the imaging region of the second imaging unit overlap is a second region,
the processor differentiates a method of detecting the moving object between the first region and the second region, calculates a distance to the moving object based on the images captured by the first imaging unit and the second imaging unit;

senses the moving object from an image of the first region; and senses the moving object from an image of the second region based on the distance to the moving object and a sensing result of the moving object in the first region;

acquires a first image captured by the first imaging unit and a second image captured by the second imaging unit;

detects moving object candidates using time-series image information in the first region of the first image or the second image;

determines whether or not the detected moving object candidates enter the second region; and outputs information of positions and velocities of only the moving object candidates that have been determined to enter the second region;

wherein the processor:

acquires distance information to the moving object;

detects pedestrian candidates by generating a distance image from the distance information and determining whether or not the moving object is a pedestrian from the distance image; and determines whether or not there is a pedestrian moving from the first region to the second region in the pedestrian candidates;

when a determination that there is a pedestrian moving from the first region to the second region, sets information of the position and the velocity on the images of the moving object candidate as initial values of the pedestrian; and calculates a moving velocity of the pedestrian;

wherein movement of a background is cancelled from obtained parts in which the images have changed and the moving object has moved, and extracted parts having sizes within a range are employed as the pedestrian candidates; and wherein the sizes within the range were obtained by previously calculating sizes in which objects having average sizes from child pedestrians to adult pedestrians are imaged on the screen, and only the pedestrian candidates moving from the first region to the second region are employed as the pedestrian candidates.

10. The moving object recognition apparatus according to claim 9, wherein the moving object is detected based on one image captured by the first imaging unit or the second imaging unit in the first region, and the moving object is detected based on two images captured by the first imaging unit and the second imaging unit in the second region.

11. The moving object recognition apparatus according to claim 9, wherein the processor calculates three-dimensional distance information from differences in vision of the images captured by the first imaging unit and the second imaging unit in the second region.

12. The moving object recognition apparatus according to claim 9, further comprising:

a collision determination processor that determines whether the moving object collides with an own vehicle or there is a possibility of collision; and a moving object information output device that outputs information of the moving object based on a determination result by the collision determination processor.

13. The moving object recognition apparatus according to claim 9, wherein a determination is made whether or not the pedestrian candidates detected in the first region of the first image enter the second region from the first region in the next frame.

14. The moving object recognition apparatus according to claim 9, wherein, in the first region of the second image, the pedestrian candidates are detected using images of the first region as the non-overlap region of the first and second imaging units of the second image imaged by the second imaging unit.

15. The moving object recognition apparatus according to claim 9, wherein, for the shapes of the moving object, if upper portions of the moving object resembles shapes of a head and shoulders of a human, the moving object is determined as the pedestrian.

* * * * *